United States Patent [19]

Darnell

[11] Patent Number: 5,440,868
[45] Date of Patent: Aug. 15, 1995

[54] FOLDABLE RAKE IMPLEMENT

[75] Inventor: Clete Darnell, Paducah, Ky.

[73] Assignee: Pick-Up Rake Corporation, Paducah, Ky.

[21] Appl. No.: 248,652

[22] Filed: May 25, 1994

[51] Int. Cl.⁶ ............................................. A01D 7/00
[52] U.S. Cl. ................................ 56/400.17; 56/400.19
[58] Field of Search ........... 56/400.11, 400.12, 400.17, 56/400.18, 400.2, 400.20; 294/50.6, 50.8, 50.9; 15/263

[56] References Cited

U.S. PATENT DOCUMENTS

| | | | |
|---|---|---|---|
| 678,519 | 7/1901 | Robinson | 56/400.19 X |
| 2,790,296 | 4/1957 | Bernstein | 56/400.19 X |
| 3,606,436 | 9/1971 | Lynch | 294/50.8 X |
| 3,855,766 | 12/1974 | Lutz | 56/400.18 |
| 4,086,750 | 5/1978 | White | 56/400.18 |

FOREIGN PATENT DOCUMENTS 118086 2/1947 Sweden ............................ 56/400.17

*Primary Examiner*—David J. Bagnell
*Attorney, Agent, or Firm*—Gilliam & Stockwell

[57] ABSTRACT

A foldable rake implement includes an elongated handle having a proximal end to be grasped by the user and a distal end. An articulated frame structure is attached to the handle at the distal end. The articulated frame structure includes a central axis of articulation dividing the frame structure into two mirror-image first and second frame halves. The axis of articulation is coaxial with the handle and defines an axis about which the articulated frame structure moves between an unfolded position whereat the first and second frame halves of the frame structure symmetrically project outwardly to opposite lateral sides of the handle and a folded position whereat the first and second frame halves are moved toward each other and into generally mutual overlaying relationship. The articulated frame structure further includes a plurality of spaced-apart tines, a plurality of first tranverse fingers projecting outwardly from one side of the first frame half, and a plurality of second transverse fingers projecting outwardly from one side of the second frame half opposite the first fingers.

20 Claims, 6 Drawing Sheets

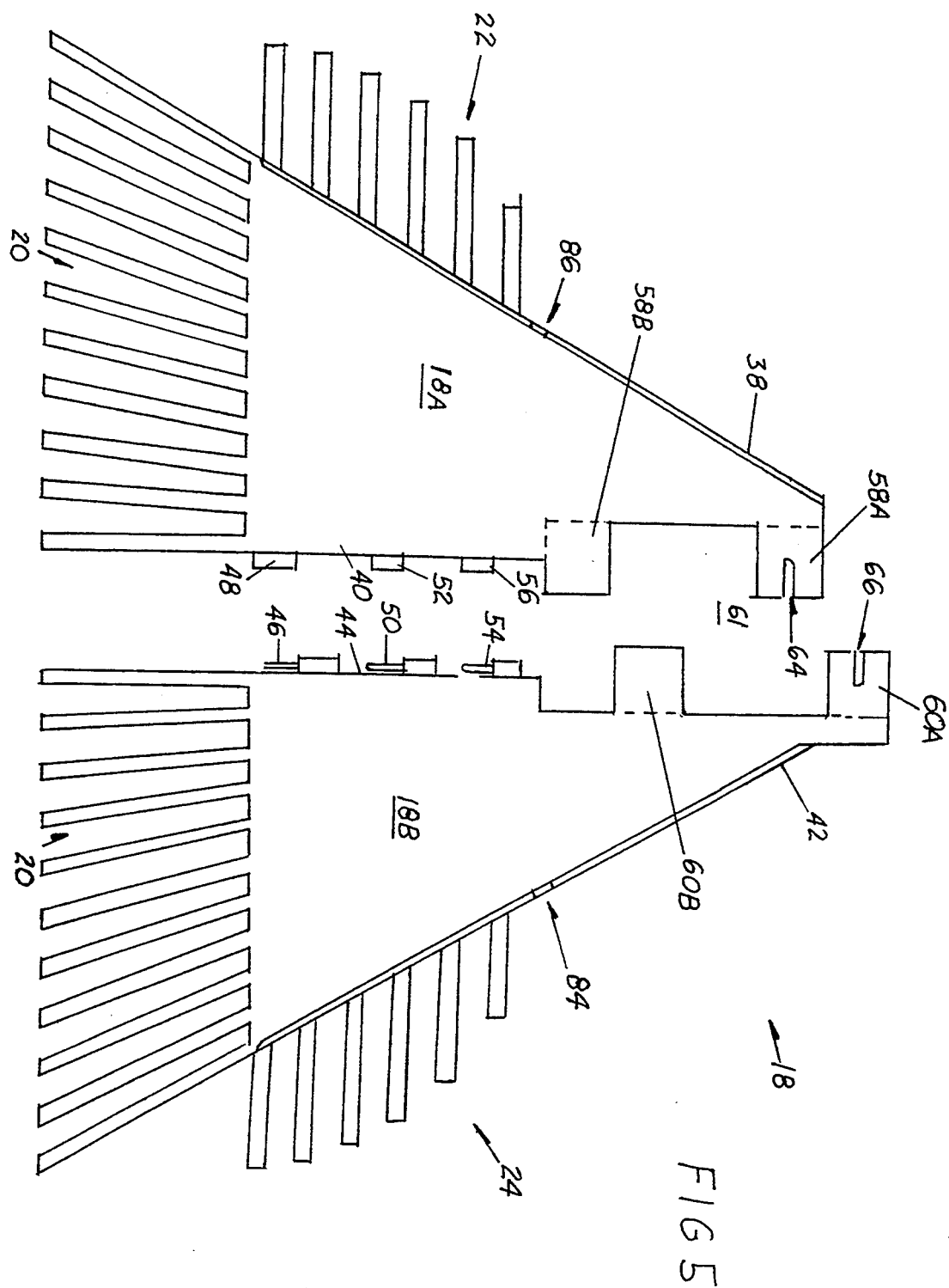

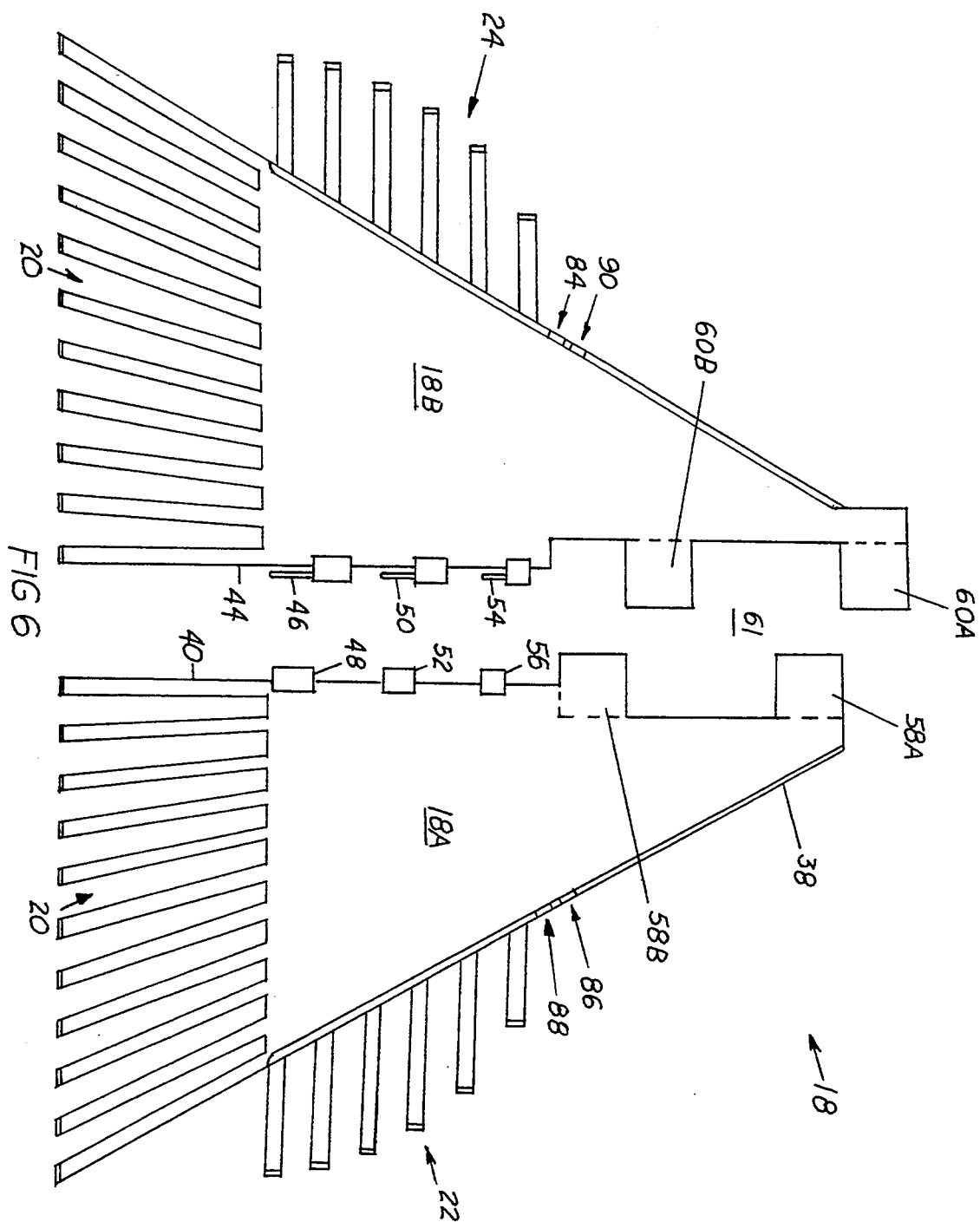

FOLDABLE RAKE IMPLEMENT

TECHNICAL FIELD

The present invention relates to rake implements, and more particularly to a rake implement having an articulated frame structure.

BACKGROUND OF THE INVENTION

Rakes known to me have tines mounted to or integral with a rigid frame structure, with the tines in a fixed row at the distal end of the rake handle. These known rakes are used to gather debris (such as leaves or grass clippings) into groups or piles on the ground, but are not well-suited for lifting the gathered debris from the ground for disposal.

A typical method used with a conventional rake to lift the gathered debris from the ground by a person working with the rake is to use one hand to hold the gathered debris against the fixed row of tines and then lift the rake with the other hand grasping the rake handle.

SUMMARY OF THE INVENTION

The present invention recognizes the drawbacks of the rake implements heretofore known to me and provides an articulated frame structure having rake tines so that the articulated frame structure can be moved between an unfolded position wherein the tines are held in a spaced-apart row for readily gathering the debris on the ground, and a folded position wherein the tines are moved to at least partially enclose or encircle the gathered debris so as to be easily lifted from the ground without aid by the person using the rake implement.

More particularly, the present invention provides a foldable rake implement comprising an elongated handle having a proximal end and a distal end. An articulated frame structure having tines is attached to the elongated handle at its distal end for articulated movement between folded and unfolded positions about an axis of articulation or folding axis coaxial with the longitudinal axis of the handle. An articulating means is associated with the handle and the articulated frame structure for selectively moving the articulated frame structure about the axis of articulation between folded and unfolded positions. A plurality of transverse fingers project outwardly from opposing sides of the articulated frame structure to assist in gathering debris when the rake implement is moved to the folded position.

BRIEF DESCRIPTION OF THE DRAWINGS

A better understanding of the present invention will be had upon reference to the following description in conjunction with the accompanying drawings, wherein like numerals refer to like parts throughout the several views and in which:

FIG. 5 is an enlarged exploded front side view of the frame structure shown in FIG. 3; and FIG. 6 is an enlarged exploded back side view of the frame structure shown in FIG. 3.

DETAILED DESCRIPTION OF THE PREFERRED EMBODIMENTS

Figure 1:
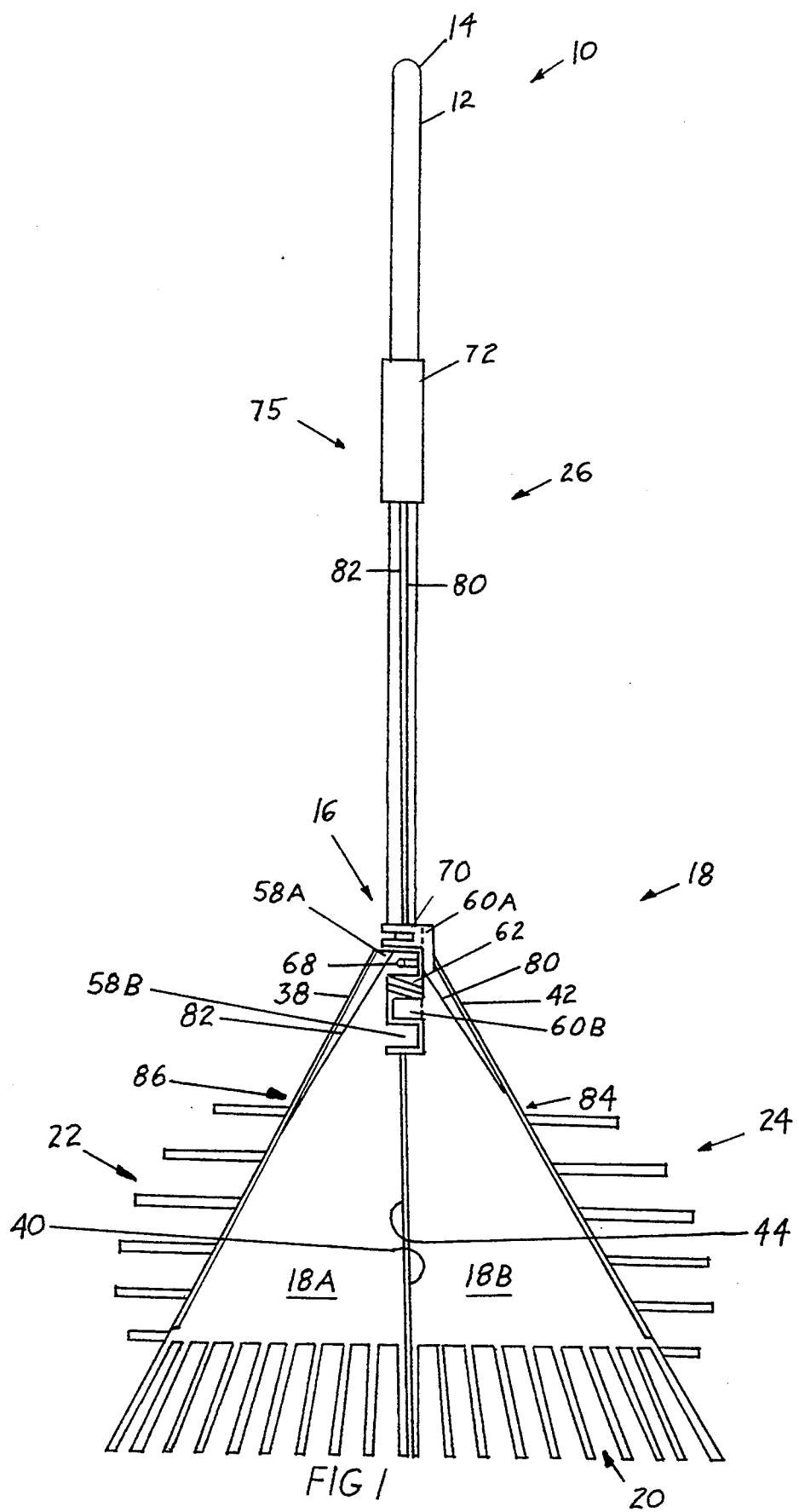
FIG. 1 is a front side view of an embodiment of the foldable rake implement of the present invention.

With reference to the drawing figures, there is shown a foldable rake implement, generally denoted as the numeral 10, constructed in accordance with the teachings of the present invention. The foldable rake implement 10 includes an elongated handle 12 (preferably cylindrical in transverse cross-section) having a proximal end 14 and a distal end 16, and an articulated frame structure 18 attached to the elongated handle at the distal end. The articulated frame structure 18 has a central axis of articulation dividing the frame structure into two mirror-image, symmetrically disposed first and second frame halves 18a and 18b, respectively. The frame structure 18 includes a plurality of spaced-apart tines 20 projecting outwardly from the edge of the frame structure opposite the portion thereof attached to the distal end 16 of the handle 12.

In one of the key aspects of the inventive rake implement, the frame structure 18 includes a plurality of spaced-apart first transverse fingers 22 projecting outwardly from one side of the frame structure generally transverse to the tines 20. Similarly, a plurality of spaced-apart second transverse fingers 24 are disposed to project outwardly from the other side of the frame structure 18 generally transverse to the tines 20.

An articulating means 26 is associated with the handle 12 and the articulated frame structure 18 for selectively moving the first and second frame halves 18a and 18b about the axis of articulation or folding axis. In the preferred embodiment, the articulating means 26 is a manually operated assembly that causes the frame halves 18A and 18B to move between an unfolded position whereat the frame halves symmetrically protrude or project outwardly to opposite lateral sides of the handle 12, with the tines 20 disposed in a row generally across the portion of the frame structure 18 opposite the distal end 16 of the handle 12, and a folded position whereat the frame halves are disposed in a generally mutual overlaying relationship. In this folded position, the tines 20 form a generally curved or arcuate array, with the distal ends of those tines on the first frame half 18A approaching the distal ends of those tines on the second frame half 18B, and with the distal ends of the fingers 22 approaching the distal ends of the fingers 24.

In operation, the articulated frame head halves 18A and 18B are generally in the unfolded position, with the tines 20 in a spaced-apart row. This configuration permits the rake implement 10 to gather debris into piles on the ground. Then the articulated frame structure 18 is urged to the folded position so that the frame halves 18A and 18B, with the associated tines 20 and fingers 22 and 24, are configured to cage the gathered debris in order to provide for lifting the gathered debris from the ground.

In the preferred embodiment of the articulated frame structure 18, the first frame half 18A has an outside edge 38 and an inside edge 40, and the second frame half 18B similarly has an outside edge 42 and an inside edge 44. The first transverse fingers 22 project outwardly from the outside edge 38 of the first frame half 18A, and the second transverse fingers 24 project outwardly from the outside edge 42 of the second frame half 18B. The first and second frame halves 18A and 18B are essentially identically shaped and configured, and are disposed in mutual mirror-image relationship. As such, the inside edge 40 of the first frame half 18A is in juxtaposition to the inside edge 44 of the second frame half 18B so that the frame halves project outwardly from generally opposite lateral sides of the handle 12.

The articulated frame structure 18 further includes hinge means defining the folding axis of articulation which pivotally interconnects the first and second frame halves 18A and 18B to handle 12, and to each other for folding motion about the axis of articulation. As is understood by those skilled in the art, the hinge means facilitates movement of the frame halves 18A and 18B between the unfolded position and the folded position.

Figure 2:
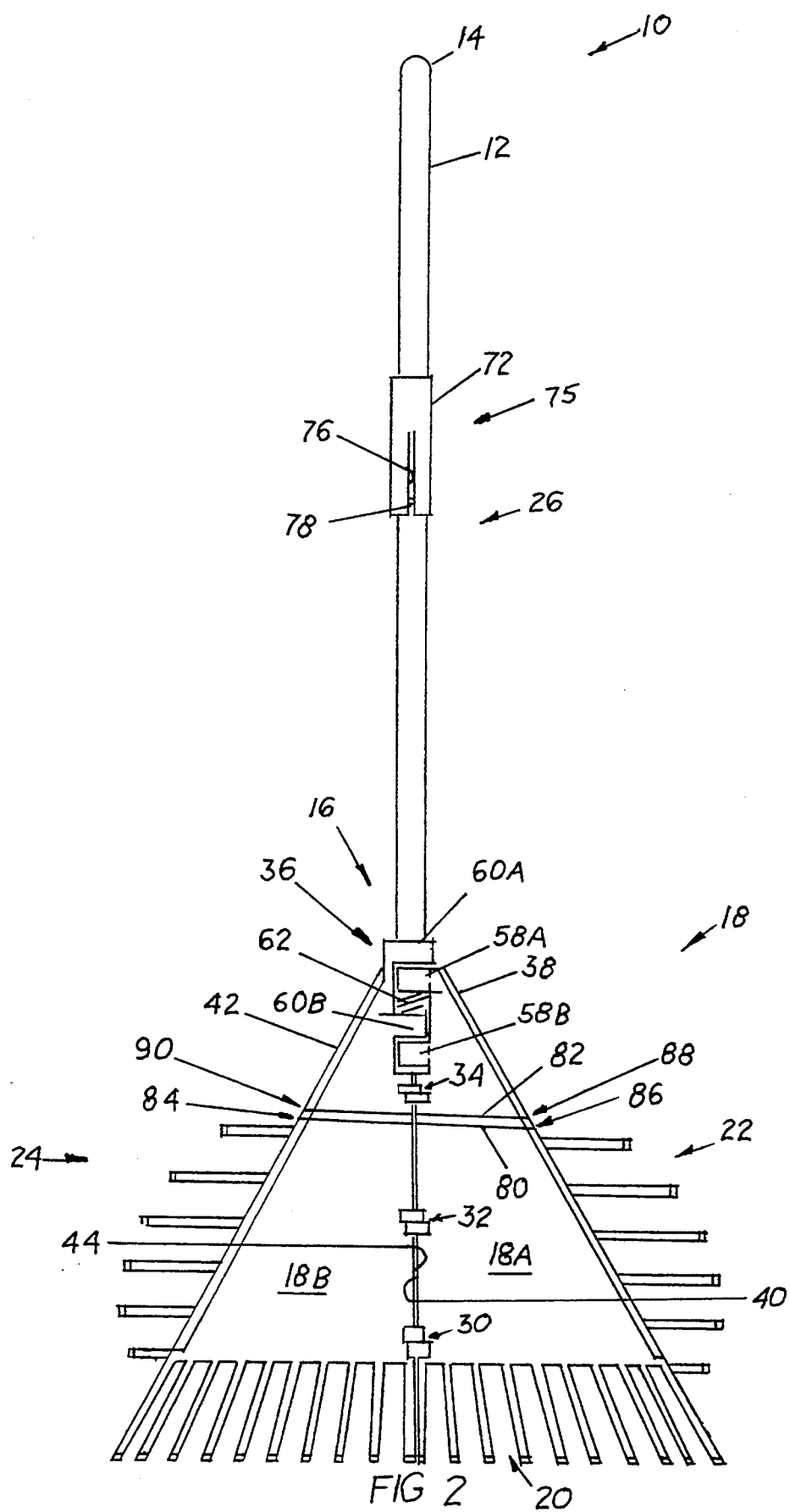
FIG. 2 is a back side view of the foldable rake implement of FIG. 1.
Figure 4:
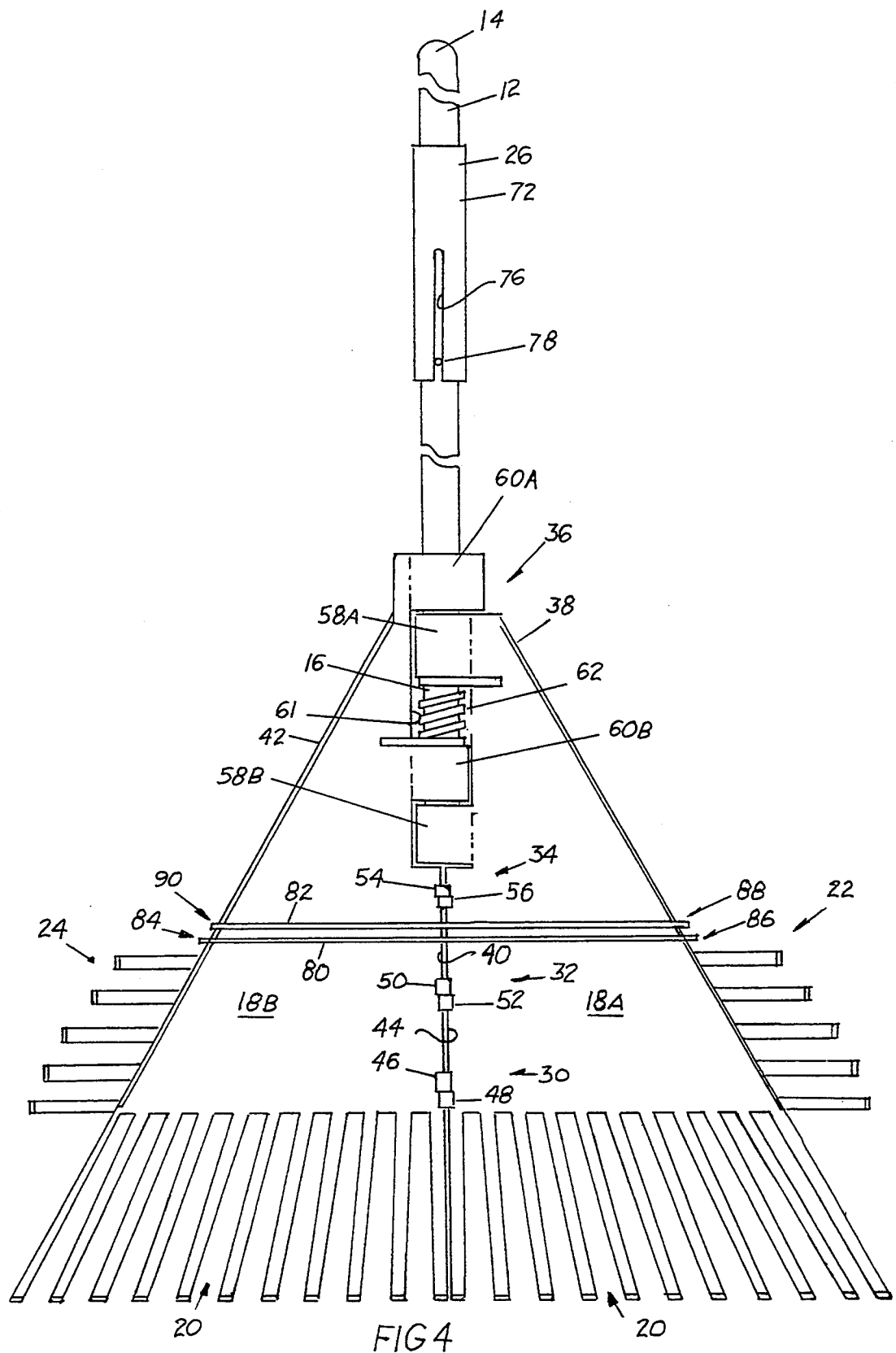
FIG. 4 is an enlarged back side view of the frame structure shown in FIG. 3.

With reference to FIGS. 2, 4, 5 and 6, the hinge means preferably comprises a first hinge joint 30, a second hinge joint 32 and a third hinge joint 34 interconnecting the first and second frame halves 18A and 18B at the interface thereof. A main hinge coupling 36 interconnects the frame structure 18 to the distal end 16 of the handle 12.

The first hinge joint 30 comprises a hinge pin 46 attached to the second frame half 18B proximate the inside edge 44 thereof, and a hinge pin receiving clevis 48 attached to the first frame half 18A proximate the inside edge 40 thereof to receive the hinge pin 46. Similarly, the second hinge joint 32 comprises a hinge pin 50 attached to the second frame half 18B proximate the inside edge 44 thereof, and a hinge pin receiving clevis 52 attached to the first frame half 18A proximate the inside edge 40 thereof to receive the hinge pin 50. Likewise, the third hinge joint 34 comprises a hinge pin 54 attached to the second frame half 18B proximate the inside edge 44 thereof, and a hinge pin receiving clevis 56 attached to the first frame half 18A proximate the inside edge 40 thereof to receive the hinge pin 54. The first hinge pin 46 of the first hinge joint 30 is longer than the second hinge pin 48 of the second hinge joint 32, and the second hinge pin of the second hinge joint is longer than the third hinge pin 54 of the third joint 34 to make it easier to assemble the first and second frame halves 18A and 18B together.

The first, second and third hinge joints are located on the underside surface of the frame structure 18 and are spaced apart from each other along the interfacing inside edges 40 and 44 of the first and second frame halves 18A and 18B, respectively. Further, the first hinge joint 30 is spaced outwardly from the underside surface of the frame structure 18 by a greater distance than that of the second hinge joint 32 and the second hinge joint is spaced outwardly from the underside surface of the frame structure by a greater distance than that of the third hinge joint 34.

The main hinge coupling 36 comprises a pair of first hinge clevises 58A and 58B at the top end of the first frame half 18A spaced apart from each other along the inside edge 40 thereof, and a pair of second hinge clevises 60A and 60B at the top end of the second frame half 18B spaced apart from each other along the inside edge 44 of the second frame halve 18B. The pair of first hinge clevises 58A and 58B intermesh with the pair of second hinge clevises 60A and 60B at the top end of the frame structure 18 for receiving the distal end 16 of the handle 12. The handle 12 thus functions as a hinge pin for the main hinge coupling 36.

The hinge clevises 58A and 58B are secured to or integrally formed with the first frame half 18A at the inside edge 40 and the hinge clevises 60A and 60B are secured to or integrally formed with the second frame half 18B at the inside edge 44. Furthermore, in the configuration of the preferred embodiment, the hinge clevis 58A of the first pair of hinge clevises and the hinge clevis 60B of the second pair of hinge clevises are spaced apart from each other to provide a biasing means receiving space 61 therebetween.

Figure 3:
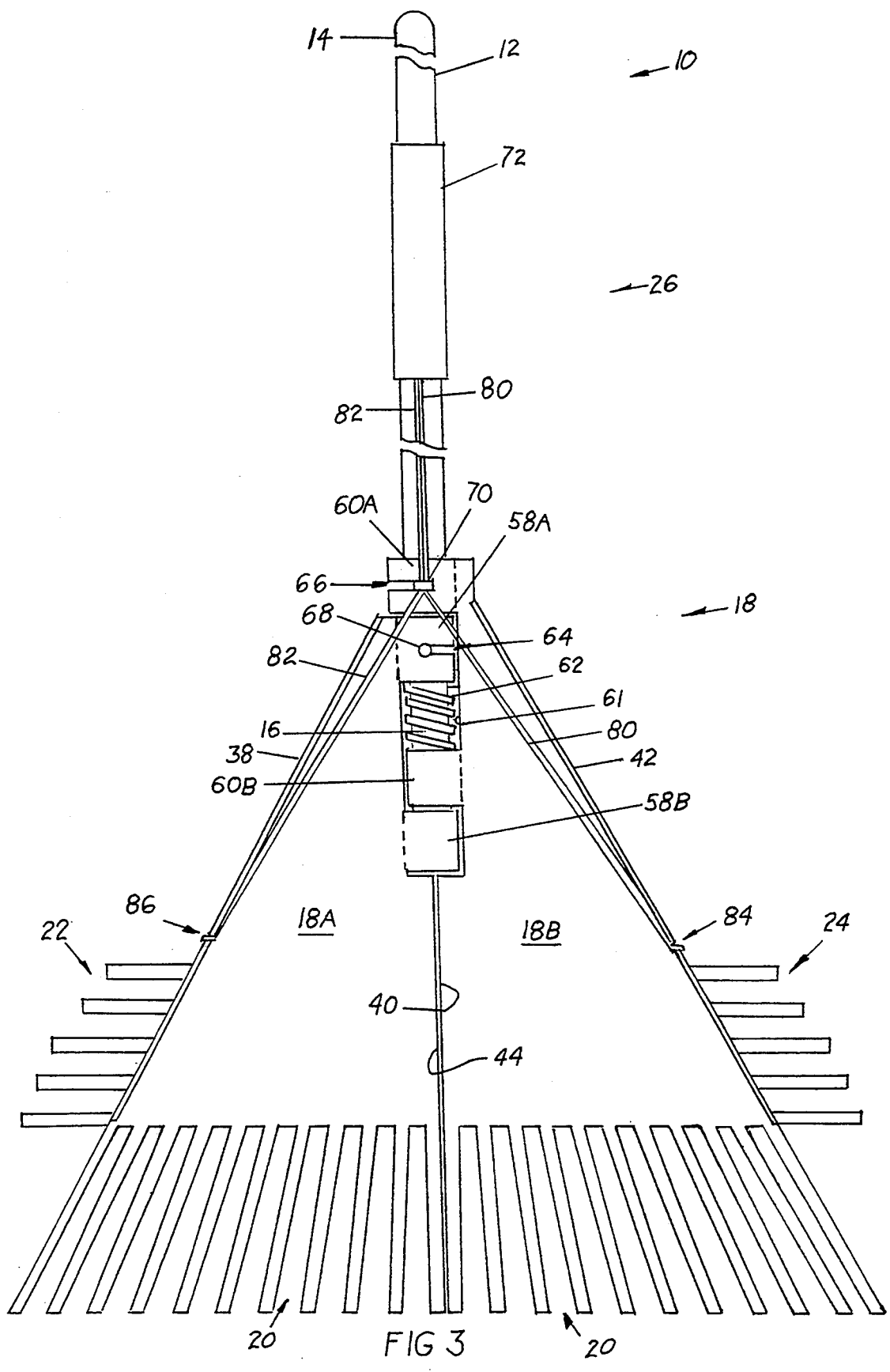
FIG. 3 is an enlarged front side view of the frame structure of the foldable rake implement of FIG. 1 with the handle foreshortened.

With reference to FIGS. 1 through 4, the articulated frame structure 18 further comprises biasing means 62 interacting with the first frame half 18A and the second frame half 18B for biasing the frame halves about the hinge joints 30, 32 and 34 and the main hinge coupling 36 toward the unfolded position. As shown, the biasing means 62 includes a coiled spring which is located in the space 61 between the clevises 58A of the first pair of clevises and 60B of the second pair of clevises of the main hinge coupling 36, and is concentrically disposed over the distal end 16 of the handle 12. One end of the coiled spring is disposed in contact with the underside of the first frame half 18A, and the other end of the coiled spring is disposed in contact with the underside of the second frame half 18B.

In order to prevent movement of the frame halves 18A and 18B past extreme limits in the unfolded position under the force of the biasing means 62, the main hinge coupling 36 includes a stop means. In the preferred embodiment, the stop means is shown as including a circumferential slot 64 in the clevis 58A of the first pair of clevises, and a circumferential slot 66 in the clevis 60A of the second pair of clevises of the main hinge coupling 36. A first stop pin 68 is attached to the handle 12 and projects inwardly in the slot 64 of the clevis 58A, and a second stop pin 70 is attached to the handle and projects inwardly in the slot 66 of the clevis 60A. Preferably, the second stop pin 70 is an eye bolt adapted to form a cable guide eye fitting.

With the frame halves 18A and 18B in the unfolded position, the first stop pin 68 contacts the closed end of the slot 64 in the clevis 58A and the second stop pin 70 contacts the closed end of the slot 66 in the clevis 60A. This prevents further movement of the frame halves 18A and 18B under the influence of the coiled spring 62.

Now with reference to FIGS. 1 through 4, the manually operated articulating means 26 in the preferred design comprises an actuator device 72 and an activating means 74. The actuator device 72 is desirably mounted to the handle 12 between the proximal end 14 and distal end 16 thereof, and is movable between a deactuated position and an actuated position. The activating means causes interaction between the actuator device 72 and the articulated frame structure 18 about the axis of articulation defined by the hinge means when the actuator device is moved from the deactuated position to the actuated position. The activating means 74 also provides for the unfolding movement of the articulated frame structure 18 about the axis of articulation under the influence of the biasing force generated by the biasing means 62 when the actuator device 70 is moved from the actuated position to the deactuated position.

The actuator device 72 is shown as a sleeve 75 coaxially receiving the handle 12 for sliding movement back and forth along the longitudinal axis of the handle between the deactuated position (toward the distal end 16 of the handle) and the actuated position (toward the proximal end 14 of the handle). An elongated notch 76 is formed longitudinally in the sleeve 75 and a pin 78 is attached to the handle 12 and projects upwardly through the longitudinal notch 76 to keep the sleeve 75 from rotating around the handle and to act as a stop for preventing the sleeve 75 from sliding downwardly toward the distal end 16 along the handle past the extreme limit of the deactuated position.

The activating means comprises a first link interconnecting the actuator device 72 and the first frame half 18A, and a second link interconnecting the actuator device 72 and the second frame half 18B. Therefore, when the actuator device 72 is moved to the actuated position, the first link moves the first frame half 18A toward the folded position and, simultaneously, the second link moves the second frame half 18B toward the folded position against the biasing force of the biasing means 62.

The first link is shown as a first cable 80 connected at one end to the actuator sleeve 75 and connected at the other end to the first frame half 18A, and the second link is shown as a second cable connected at one end to the actuator sleeve 75 and connected at the other end to the second frame half 18B. Toward this objective, the second frame half 18B is formed with a first cable guide notch 84 formed in the outside edge 42 thereof, and the first frame half 18A is formed with a second cable guide notch 86 formed in its outside edge 38.

Further, a first cable attachment aperture 88 is formed in the outside edge 38 of the first frame half 18A above the second cable guide notch 86, and a second cable attachment aperture 90 is formed in the outside edge 42 of the second frame half 18B above the first cable guide notch 84. The first cable guide notch 84 formed in the second frame half 18B is in substantial longitudinal alignment with the first cable attachment aperture 88 formed in the outside edge 38 of the first frame halve 18A across the frame structure 18. The second cable guide notch 86 formed in the outside edge 38 of the first frame half 18A is in substantial alignment with the second cable attachment aperture 90 formed in the outside edge 42 of the second frame half 18B across the frame structure 18.

The first cable 80 extends from the actuator sleeve 75 through a guide eye fitting of the second stop pin 70 to the first cable guide notch 84 in the second frame half 18B. The first cable 80 is trained through the first cable guide notch 84 and extends therefrom transversely across the frame structure 18 for attachment to the first cable attachment aperture 88 of the first frame half 18A. Similarly, the second cable 82 extends from the actuator sleeve 75 through the guide eye fitting of the second stop pin 70 to the second guide notch 86 in the first frame half 18A. The second cable 82 is trained through the second cable guide notch 86 and extends therefrom transversely across the frame structure 18 for attachment to the second cable attachment aperture 90 of the second frame half 18B.

Again referring to one of the key inventive features, the first transverse fingers 22 are formed at the outside edge 38 of the first frame half 18A in a spaced-apart row along and protruding outwardly therefrom, and the second transverse fingers 24 are formed at the outside edge 42 of the second frame half 18B in a spaced-apart row along and protruding outwardly therefrom. Preferably, the transverse fingers 22 are of different lengths such that the distal ends thereof lay in an arcuate path. The fingers 24 are also of different lengths so that the distal ends thereof lay in an arcuate path. This transverse finger 22, 24 arrangement assists in the capturing and lifting function of the foldable rake implement 10.

Preferably, the first and second rake halves 18A and 18B are fabricated of a plastic material and are of a unitary construction.

In the operation of the foldable rake implement 10, with the actuator device 72 in the deactuated position, the first and second frame halves 18A and 18B are in the unfolded portion, symmetrically projecting outwardly from opposite lateral sides of the handle 12 under the influence of the biasing means 62. The tines 20 are thus disposed in a spaced-apart row across the portion of the frame structure 18 opposite the distal end 16 of the handle 12, such that they are in a suitable configuration for gathering debris on the ground. When the debris has been gathered, the actuator device 72 is moved along the handle 12 to the actuated position by pulling the actuator device upwardly toward the proximal end 14 of the handle. This action pulls the first and second cables 80 and 82, causing the first and second frame halves 18A and 18B to move toward each other about the hinge means to the folded position (into a generally mutual overlaying relationship) against the biasing force of the biasing means 62. The gathered debris is thereby enclosed or captured by the tines 20 of the first and second frame halves 18A and 18B and by the first and second transverse fingers 22 and 24. The captured debris is thus readily lifted from the ground and deposited in, for example a container, for disposal.

In order to release the captured debris from the articulated frame structure 18, the actuator device 72 is moved back to the deactuated position by pushing the sleeve 75 along the handle 12 toward the distal end 16 of the handle 12. This releases the tension or pulling force on the first and second cables 80 and 82. As the tension on the first and second cables 80 and 82 is released, the biasing means 62 forces the first and second frame halves 18A and 18B to pivot or unfold away from each other about the axis of articulation defined by the hinge means back to the unfolded portion.

The foregoing detailed description is given primarily for clearness of understanding and no unnecessary limitations are to be understood therefrom. Modifications will become obvious to those skilled in the art upon reading this disclosure and may be made without departing from the scope of the inventions or scope of the appended claims.

I claim:

1. A foldable rake implement, comprising:
   an elongated handle having a proximal end and a distal end;
   an articulated frame structure having a centrally disposed axis of articulation coaxial with a longitudinal axis of the handle, the frame structure attached to the handle proximate the distal end for articulated movement between folded and unfolded positions about the axis of articulation;
   a plurality of projecting tines secured to the articulated frame structure for motion therewith between the folded and unfolded positions; and
   articulating means associated with the handle and the articulated frame structure for selectively folding and unfolding the articulated frame structure about the axis of articulation between folded and unfolded positions.

2. The foldable rake implement of claim 1, further comprising:
   a plurality of first transverse fingers projecting outwardly from a first side of the frame structure; and a plurality of second transverse fingers projecting outwardly from a second side of the frame structure.

3. The foldable rake implement of claim 2, further comprising:
a first frame half having an outside edge and an inside edge, the plurality of first transverse fingers spaced apart along the outside edge of the first frame half; and
a second frame half having an outside edge and an inside edge, the plurality of second transverse fingers spaced apart along the outside edge of the second frame half,
the first and second frame halves being disposed with the inside edge of the first frame half in juxtaposition with the inside edge of the second frame half further defining the centrally disposed axis of articulation.

4. The foldable rake implement of claim 3, further comprising a main hinge coupling formed in the frame structure for interconnecting the frame structure to the distal end of the handle.

5. The foldable rake implement of claim 4, wherein the main hinge coupling defines a socket for receiving the distal end of the handle.

6. The foldable rake implement of claim 5, wherein the main hinge coupling comprises a first hinge clevis formed in the first frame half and a second hinge clevis formed in the second frame half, the first and second hinge clevises intermeshing and defining the socket for receiving the distal end of the handle.

7. The foldable rake implement of claim 5, further comprising biasing means coacting with the first and second frame halves for biasing the first and second frame halves to the unfolded position.

8. The foldable rake implement of claim 1, wherein the articulated frame structure comprises:
first and second frame halves disposed in side-by-side mutual relationship; and
hinge means defining the axis of articulation, pivotally interconnecting the first and second frame halves together, and connecting the first and second frame halves to the handle.

9. The foldable rake implement of claim 8, wherein the hinge means comprises:
a main hinge coupling interconnecting the frame structure to the distal end of the handle; and
a hinge joint interconnecting the first and second frame halves,
the hinge axis of the main hinge coupling and the hinge axis of the hinge joint being coaxial with the longitudinal axis of the handle.

10. The foldable rake implement of claim 9, wherein the first and second frame halves each include an outside edge and an inside edge, the first and second frame halves being disposed with the inside edge of the first frame half in juxtaposition to the inside edge of the second frame half.

11. The foldable rake implement of claim 10, wherein:
the main hinge coupling comprises intermeshing hinge clevises connected to the first and second frame halves proximate the interfacing inside edges of each of the first and second frame halves, the intermeshing hinge clevises receiving the distal end of the handle; and
the hinge joint comprises a hinge pin attached to the first frame half proximate the inside edge thereof, and a hinge pin receiving clevis attached to the second frame half proximate the inside edge thereof.

12. The foldable rake implement of claim 11, wherein is included a plurality of hinge joints interconnecting the first and second frame halves, the plurality of hinge joints being spaced apart from each other along the length of the interfacing inside edges of the first and second frame halves.

13. The foldable rake implement of claim 12, wherein the hinge pins of the plurality of first hinge joints are spaced outwardly from the underside of the frame structure.

14. The foldable rake implement of claim 13, wherein a hinge pin of a first one of the plurality hinge joints that is most adjacent to the end of the frame structure from which the tines project is spaced from the underside of the frame structure by a greater distance than the distance by which a hinge pin of a second one of the plurality of hinge joints next adjacent to the first one of the plurality of hinge joints is spaced from the underside of the frame structure.

15. The foldable rake implement of claim 1, wherein the articulating means comprises:
an actuator device mounted to the handle and movable between an actuated position and a deactuated position; and
activating means interconnecting the actuator device and the articulated frame structure for causing folding movement of the articulated frame structure about the axis of articulation upon movement of the actuator device to the actuated position.

16. The foldable rake implement of claim 15, wherein the articulated frame structure comprises:
a first frame half comprising an outside edge and an inside edge; and
a second frame half comprising an outside edge and an inside edge,
the first and second frame halves being disposed with the inside edge of the first frame half in juxtaposition to the inside edge of the second frame half.

17. The foldable rake implement of claim 16, wherein the activating means comprises:
a first link interconnecting the actuator device and the first frame half; and
a second link interconnecting the actuator device and the second frame half.

18. The foldable rake implement of claim 17, wherein the first frame half has a first link guide and the second frame half has a second link guide.

19. The foldable rake implement of claim 18, wherein the first frame half has a first link attachment and the second frame half has a second link attachment.

20. The foldable rake implement of claim 16, further comprising biasing means coacting with the first and second frame halves for biasing the first and second frame halves away from each other about the axis of articulation to the unfolded position.

* * * * *